April 15, 1969     L. C. HERTOGHE ET AL     3,438,651
SAFETY FEATHER ATTACHMENT FOR CHILD'S VEHICLE
Filed May 22, 1967
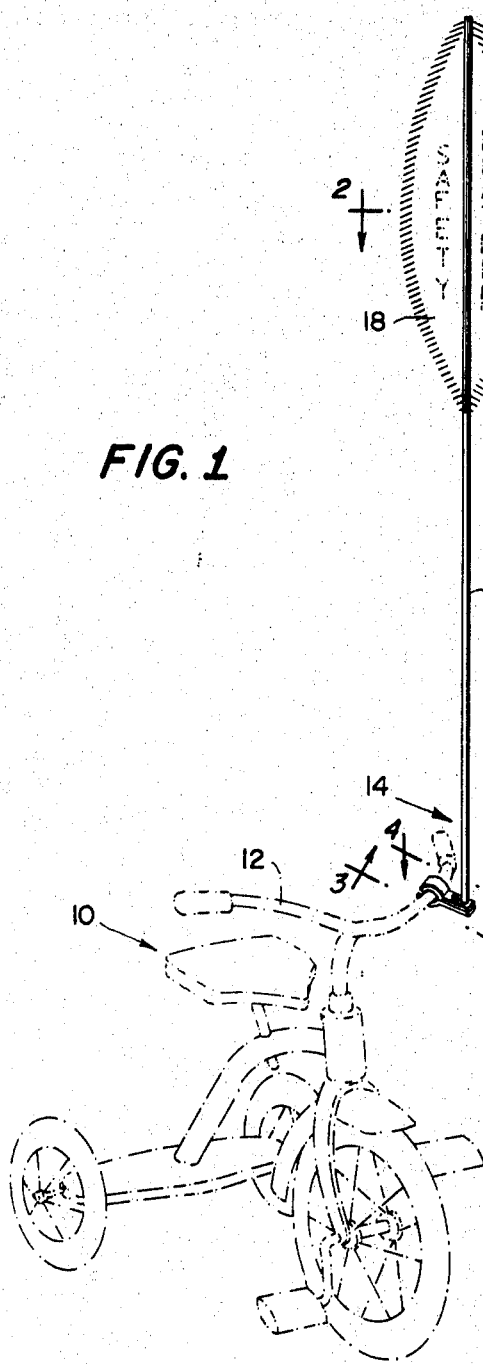
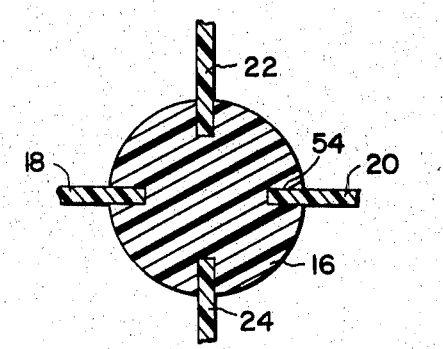
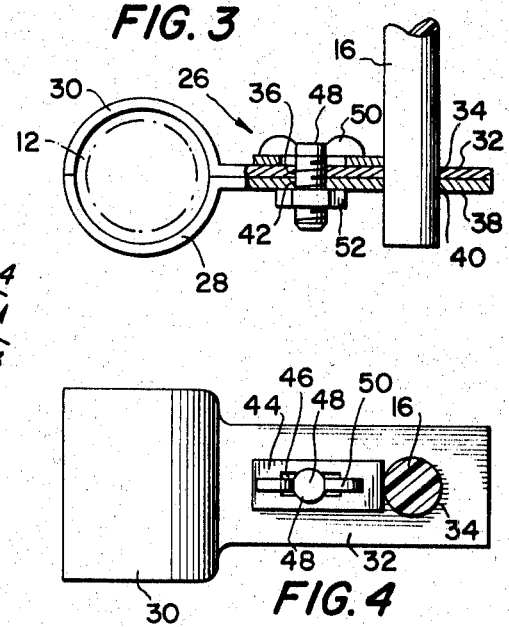
INVENTORS
LEO C. HERTOGHE
ADRIENNE F. HERTOGHE
BY *Kimmel, Crowell & Weaver*
ATTORNEYS

United States Patent Office 3,438,651
Patented Apr. 15, 1969

3,438,651
SAFETY FEATHER ATTACHMENT FOR CHILD'S VEHICLE
Leo C. Hertoghe and Adrienne F. Hertoghe, both of 8043 Grandstaff Drive, Sacramento, Calif. 95823
Filed May 22, 1967, Ser. No. 640,060
Int. Cl. B62h; B62j; A47g 25/12
U.S. Cl. 280—289                              2 Claims

ABSTRACT OF THE DISCLOSURE

A support which carries a brightly colored feather on the upper end and a clamp for securing the support to handle bars of a child's vehicle such as a tricycle for giving warning of the presence of the tricycle to persons in the vicinity and an improved clamp for such utilization which includes a keeper which engages the edge of the support to secure the support in apertures in a pair of clamp members is disclosed.

BACKGROUND OF THE INVENTION

Field of the invention

This invention relates to safety warning signals and more particularly to safety warning signals for movable vehicles and even more specifically to a warning signal for a child's tricycle.

Description of the prior art

The utilization of various types of warning signals on vehicles is known in the prior art. For example, every one is familiar with the lights provided on automobiles for giving warning of their presence and of proposed maneuvers. In addition, it is known to provide signalling devices on vehicles which extend upwardly into the air for giving a warning of some characteristic of the vehicle, the presence of the vehicle, or a proposed maneuver of the vehicle. Such devices, however, have not been utilized for tricycles because of their cost and complexity.

Notwithstanding this lack of utilization, it is well recognized that each year many children are injured and many lose their lives while riding tricycles or small bicycles on sidewalks, in streets, and in driveways because the drivers of vehicles are unable to see the tricycle. This is particularly true where the driver is attempting to back the automobile along the driveway or street. His view is limited and he usually relies upon a rear view mirror which may not be adjusted so as to permit viewing of shorter articles immediately adjacent the rear of the automobile. Thus, the tragedy often occurs that a child riding a tricycle may be in the driveway or in the street and may be run over by the backing automobile. It is to the prevention of such accidents that the present invention is directed. Accordingly, it is an object of the present invention to provide a safety feather which is light enough and inexpensive enough for common utilization on tricycles and the like.

SUMMARY

The present invention is directed to a safety device for use in combination with a tricycle or a child's vehicle of the type which includes a handle bar.

It is also an object of the present invention to provide a specially designed clamp and vertical support for a feather wherein the feather is supported a substantial distance above a tricycle for giving a warning of the presence of the tricycle.

An additional and important object of the present invention is the provision of a combination clamp and support in which the support is secured to the clamp by a keeper which engages the edge of the support.

An additional object of the invention is the provision of a combination which includes a novel clamp and keeper and a vertical support which includes colorful feathers on the top thereof for attracting the attention of persons in the vicinity and particularly for attracting the attention of drivers of automobiles in the vicinity.

The specific constructional details also constitute an object of this invention.

BRIEF DESCRIPTION OF THE DRAWING

FIGURE 1 is an overall view of the combination of this invention showing the tricycle, the clamp, the support and the safety feather of this invention.

FIGURE 2 is a cross-sectional view taken substantially along lines 2—2, as shown in FIGURE 1, showing the construction of the feather.

FIGURE 3 is a side view shown in partial cross section showing the details of the construction of the clamp of this invention.

FIGURE 4 is a top view of the clamp showing the construction of the keeper and its engagement with the support.

DESCRIPTION OF THE PREFERRED EMBODIMENT

While the safety feather of this invention may be used for any child's vehicle of the type which includes a handle bar, it is particularly adapted and designed for use with a child's tricycle such as is shown at 10 and includes a handle bar 12. The safety device 14 includes an elongate shaft or vertical support 16 which is substantially rigid. That is, the support is rigid enough to hold its own weight and extend vertically from the tricycle a substantial distance. It should, however, be at least partially flexible to absorb slight bends in use and it should be tough enough to withstand comparatively rough handling. The shaft or support 16 may be made of wood but is preferably made of a tough resilient substantially rigid plastic, such as vinyl, styrene, acrylic resins, and may preferably be made of a fiber glass construction impregnated with polyester resins.

At least one feather of the type shown at 18 and of the type shown at 20 is provided proximate the upper end of the support 16. In the preferred embodiment, however, four feathers 18, 20, 22 and 24 are provided, as shown in FIGURE 2.

With reference to FIGURE 3, the invention includes a clamp shown generally at 26 which includes a lower member 28 and an upper member 30. The upper member 30 is provided with an area which is curved and especially adapted to extend at least partially around the handle bar and a flat portion shown at 32. The flat portion includes an aperture 34 for receiving the support 16 and an aperture 36 for receiving a bolt.

In a similar manner, the lower member includes a portion curved and adapted to extend at least partially around the handle bar and a flat portion shown at 38 which includes an aperture 40 for the support and an aperture 42 for the bolt. As will be seen, the apertures 34 and 40 and the apertures 36 and 42 are in alignment in use for receiving, respectively, the support 16 and a bolt.

A keeper 44 which is provided with an elongate aperture 46 receives a bolt 48, which also extends through the apertures 36 and 42, which is provided with wings 50 and is tightened by means of a nut 52.

An important feature of the invention is shown in FIGURES 3 and 4 wherein it is shown that the resilient keeper 44, when tightened by bolt 48 and nut 52, clamps the members 28 and 32 on the handle bar and, in addition, engages the edge of the support 16 to secure the support 16, which is tightly received in apertures 34 and 40, to retain the support in the clamp. When the nut is loosened the resilient keeper tends to bend upwardly in the middle and to release the support.

As shown in FIGURE 2, the feathers 18, 20, 22 and 24 are secured in slots such as slot 54 by means of an adhesive, preferably. Feathers may be made of conventional feathers obtained from birds such as turkeys and the like or they may be made, desirably, of a plastic material such as vinyl and may have identifying indicia stamped or punched therein. Such indicia are shown at 56 in FIGURE 1.

In practice, the support 16 may be from about two feet to about four feet in length, according to the height of the tricycle, and is secured in an upright or vertical position by means of the clamp 26.

The feathers are made, preferably, of a brightly colored and, desirably, of a fluorescent pigment-filled plastic, such as a vinyl plastic. The brilliant orange fluorescent pigments commonly used in safety devices may conveniently be used in the safety feather of this invention.

It will be seen, then, that through the construction described herein, a safety feather is provided which permits the presence of the tricycle to be indicated to all persons in the vicinity and more importantly to persons driving automobiles. Because the feather is light enough, and because the clamp is simple yet sturdy, and the shaft is both light and tough, the device is well adapted for utilization on child's vehicles. This, in addition to the constructional features, is a highly important and significant feature which distinguishes the present invention over devices of the prior art.

We claim:

1. In combination with a child's vehicle of the type which includes a handle bar, a safety feather for indicating the presence of said child's vehicle which comprises:
   a clamp member for securement to said handle bar;
   an upright elongate substantially rigid support secured to said clamp for extending a substantial distance above said vehicle; and
   at least one feather secured proximate the upper end of said support, said clamp member comprising
   upper and lower members each having a relatively flat area and an area adapted to extend at least partially around said handle bar, said flat area being provided with an aperture for receiving a bolt and an additional aperture for receiving the support, said apertures being disposed for alignment with similar apertures in the other member in use, said support being tightly received in said support receiving apertures;
   a resilient keeper having an aperture therethrough;
   a bolt extending through the bolt apertures in the upper and lower members and through aperture in the keeper; and
   means for tightening the bolt to force said upper and lower members together for securement to the handle bar and for forcing an edge of the keeper into engagement with the support to secure said support in said support apertures.

2. The invention of claim 1 wherein at least one feather comprises:
   four feathers secured on the respective sides of the support, said feathers being of a bright color to thereby attract the attention of persons in the vicinity.

References Cited

UNITED STATES PATENTS

| | | | |
|---|---|---|---|
| 582,170 | 5/1897 | Brown | 248—43 |
| 1,431,691 | 10/1922 | Schroder | 248—43 X |
| 1,861,366 | 5/1932 | Sherwood | 248—43 X |
| 2,679,711 | 6/1954 | Learnard. | |
| 2,748,745 | 6/1956 | Pobanz et al. | 116—173 |
| 2,830,818 | 4/1958 | Otto | 161—11 |
| 3,099,243 | 7/1963 | Schwartz et al. | 116—28 |

KENNETH H. BETTS, *Primary Examiner.*

U.S. Cl. X.R.

116—173; 248—39